Patented Aug. 18, 1931

1,820,001

UNITED STATES PATENT OFFICE

MORRIS S. KHARASCH, OF CHICAGO, ILLINOIS, ASSIGNOR TO E. I. DU PONT DE NEMOURS & COMPANY, OF WILMINGTON, DELAWARE, A CORPORATION OF DELAWARE

SEED DISINFECTANT COMPOSITION

No Drawing.   Application filed August 9, 1929. Serial No. 384,785.

This invention relates to compounds comprising certain organic derivatives of mercury, and particularly to seed disinfectant compositions containing these derivatives, as well as to the process of manufacture.

The alkyl and aryl mercury compounds have heretofore been found to be very effective against diseases of small grain. As examples of this class of compounds, the ethyl and phenyl mercuric chlorides or their acetates have proven to be particularly useful for this purpose.

I have now found that the alkylene mercury compounds are also highly effective against diseases of grain. For illustrative purposes, these alkylene mercury compounds may be divided into two classes, as follows:

(1) $Y-Hg-R_1-R_2-HgY_1$
(2) $X-R_1-R_2-HgX_1$

In the first class, two mercury atoms are attached to two adjacent carbon atoms. The compound $ClHg-CH_2-CH_2-HgCl$ may be taken as illustrative of this class.

The second class of compounds contains a mercury attached to a carbon atom and to a negative radical. X on the adjacent carbon atom is usually an OH, an $O-C_2H_5$, or an $-O-R_1R_2HgX_1$, or $OCOCH_3$, group, while $X_1$ may be either Cl, Br, or OH. This class of compounds may, for example, be prepared by treating unsaturated ethylene derivatives with mercuric salts.

These compounds may be prepared by the reaction between a mercury salt such, for example, as mercuric acetate, mercuric chloride, mercuric sulfate, and the like, and an organic compound, preferably an aliphatic hydrocarbon, that contains an ethylene linkage such, for example, as ethylene itself, propylene, isobutylene, or in the aromatic series, compounds such as styrene, anethole, etc., or in the hydroaromatic series, compounds such as cyclohexene, methyl cyclohexene, or other cyclohexene hydrocarbons.

It will be apparent that these compounds are quite different both in method of preparation and in chemical constitution from the alkyl and aryl mercury salts described in my copending application Serial No. 199,407, filed June 16, 1927.

The statements available in the literature regarding the structure of the addition product of these unsaturated derivatives and mercuric salts are various and conflicting, and for this reason the general formula which I have adopted for the products obtained when unsaturated compounds are treated with mercuric salts may be considered as problematical. I have found, however, that very useful products can be prepared from unsaturated compounds and mercuric salts, and that the formulæ I have assigned to these products represent the best formulæ which correspond to the analyses and chemical reactions of these substances.

The classes of unsaturated compounds whose mercury compounds I have tested and found highly effective may be classified as follows:

1. Unsaturated aliphatic hydrocarbons.
2. Substituted unsaturated aliphatic compounds.

In the first class of compounds belong the products derived by treating unsaturated aliphatic hydrocarbons, for example, ethylene or propylene, with mercuric salts. These reactions may take place under a wide variety of conditions.

In the second class of compounds according to my classification belong the products derived by treating substituted unsaturated compounds of the ethylene type with mercuric salts, for example, the products derived by treating vinyl chloride, allyl cyanide, allyl alcohol, or allyl chloride, with mercuric salts.

The following are illustrative examples of some of the compounds that I have used as components of dust disinfectants for seed, prepared in general as disclosed in Example 1:

(1) 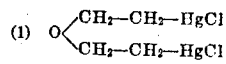

Mercuric oxide is dissolved in 30% sulfuric acid to form a practically neutral solution and ethylene gas is passed in, preferably under 5 to 25 lbs. per sq. in. pressure.

The product thus formed is converted to the chloride in the usual manner, e. g., by adding a sodium chloride solution or dilute hydrochloric acid. 40 g. of mercuric oxide give 20 g. of the product, melting at 189–192° C., to which the formula given above may be assigned. A composition comprising 1 to 10% of this compound mixed with 90 to 99% of a diluent such as finely divided clay, chalk, hydrated lime, charcoal, calcium sulfate, etc., or a mixture of diluents, forms a very effective seed disinfectant. The exact percentage of mercury compound will depend upon the conditions under which the product is to be used, but in general a 2% mixture will be found very effective.

(2) 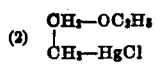

This product is formed by passing ethylene into a solution of mercuric acetate in alcohol. The product first formed is converted into the chloride by the addition of sodium chloride to the solution. From 50 g. of mercuric acetate approximately 38 g. of product were obtained, with a melting point of 89° C.

(3) 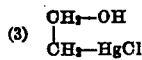

This product is made by treating a nearly saturated aqueous solution of mercuric acetate with ethylene until no more precipitate is formed. The solution is then filtered and allowed to stand about 15 hours. Potassium hydroxide in solution of any suitable strength, e. g., 20 per cent, is then added in small portions to neutralize the acetic acid liberated by the reaction while a steady stream of ethylene is passed through the solution. A precipitate separates which is filtered off. The desired compound is precipitated from the filtrate by the addition of hydrochloric acid of any suitable concentration, e. g., 10 to 20 per cent, care being taken to add not more than a very slight excess of the acid. The product after crystallization from methyl alcohol, has a melting point of 155° C.

(4) 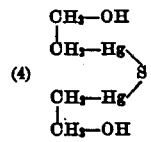

This product may be made from the compound described in Example 3 by dissolving it in a solution of potassium hydroxide, and adding H₂S or a solution of sodium sulfide.

(5) 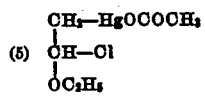

This compound may be obtained by passing vinyl chloride into an alcoholic solution of mercuric acetate. On evaporation of this solution to a small volume a white crystalline compound separates, which is dissolved in dilute hydrochloric acid, neutralized with NaOH of any suitable strength and finally made faintly acid with acetic acid. The white compound which separates is washed with water, then alcohol, and finally ether. The compound decomposes gradually when heated above 150° C. It is soluble in most organic solvents.

(6) 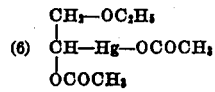

This compound may be prepared by a method similar to that employed in Example 5 by substituting vinyl acetate for vinyl chloride. It decomposes at temperatures above 175° C., because of its insolubility in most organic solvents it is difficult to purify it.

(7) 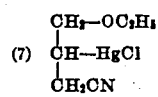

This is prepared, in the usual manner, by adding allyl cyanide to an alcoholic solution of mercuric acetate. The reaction product is converted to the chloride by treatment with sodium chloride. This compound is insoluble in most organic solvents and decomposes at temperatures above 150° C.

(8) 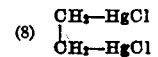

This compound may be prepared by boiling ethane mercarbide dicyanide, $$C_2Hg_4(CN)_2$$

with concentrated hydrochloric acid as described by Hoffmann (Berichte 33, page 1330).

(9) 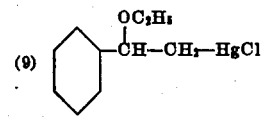

This compound may be prepared by treating styrene with a solution of mercuric acetate in ethyl alcohol, and converting the product so obtained to the chloride by adding hydrochloric acid or a solution of sodium chloride.

(10) 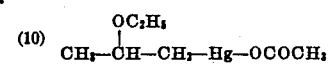

This compound may be prepared by passing propylene into an alcoholic solution of mercuric acetate.

(11) 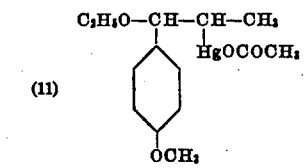

This compound may be prepared by treating anethole with an ethyl alcohol solution of mercuric acetate, and isolating the compound formed by evaporating the excess alcohol.

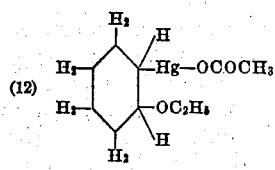

This product is made by treating an alcoholic solution of mercuric acetate with cyclohexene and isolating the product in the usual manner. The methyl or ethyl cyclohexenes can be mercurized in a similar manner, and the products thus obtained can be used in seed disinfectant compositions substantially as described in Example 1.

(13) $(CH_3)_2COH-CH_2-HgCl$

This compound may be prepared from isobutylene and mercuric acetate in the presence of alkali, followed by treatment with sodium chloride to form the chloride.

Other organic mercury compounds that may be used as seed disinfectants are the dimercuri-compound of di-propylene oxide,

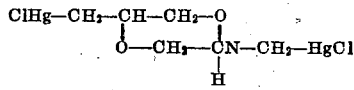

and propylene glycol mercuric bromide, $HO-CH_2-CHOH-CH_2.HgBr$. Also, by treating a solution of mercuric nitrate or acetate alternately with sodium hydroxide and terpineol, and precipitating finally with NaCl, a compound commonly known as 2-chloromercuricineol is obtained. This is effective as a seed disinfectant, when mixed in the proper proportions with suitable diluents.

A camphene mercury compound may be made by dissolving camphene in a solvent such as petroleum ether or ethyl ether, and shaking with an aqueous solution of mercuric acetate until no further action takes place. The compound obtained, which melts at approximately 190° C., may be effectively used in dust seed disinfectants as described in Example 1.

Also dust disinfectants for seeds containing compounds of this class may be prepared by a one-step process, thereby eliminating much labor and expense in manufacture. For purposes of illustration, the following example may be given:

95 parts of finely divided clay are thoroughly mixed in a closed mixer with 2 parts of lime, 1 part of charcoal, and 2 parts of mercuric acetate. Into this dry mixture ethylene is passed, preferably under pressure of 20 lbs. or so until the mercuric acetate is substantially all converted to the organic mercury compound. The residual ethylene is then drawn off and the mixture discharged as a finished seed disinfectant, ready to be packed into shipping containers.

Or, 90 parts of calcium carbonate, 7 parts of calcium sulfate, and 3 parts of mercuric acetate are mixed together in a closed mixer and propylene is passed in under pressure until the mercury salt is substantially converted. The resulting mix is then ready for use as a seed disinfectant. Other compounds described in the foregoing may be prepared in a similar manner.

It is to be understood that the foregoing examples are merely illustrative and that my invention may be applied to the wide variety of organic compounds represented by the general formulæ given. Also, it is to be understood that any mercury compound which is suitable for the mercurization of organic compounds by previously known processes may be used.

By the term "in the dry state" as used in the specification and claims of this application, it will be understood, of course, that I do not necessarily mean in the complete absence of water. The ingredients are ordinarily mixed in the state of dryness in which they are commercially available in which case a small percentage of water may be present as is well known.

The compositions of matter obtained by treating unsaturated derivatives with mercuric salts, such as the acetate, by the dry process described above are, however, ordinarily slightly different from those described in the previous examples. For instance, when anethole is mercurized by the dry process, the product obtained is probably either,

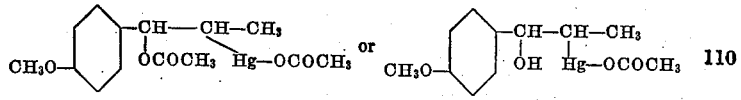

depending on the amount of moisture present in the mixture.

As many apparently widely different embodiments of this invention may be made without departing from the spirit thereof, it is to be understood that I do not limit myself to the foregoing examples or description except as indicated in the following claims.

I claim:

1. A seed disinfectant comprising an organic mercury compound of the type $Y-R'-R_2-HgX$, in which $R_1$ and $R_2$ are unsaturated hydrocarbon radicals, X is a radical taken from the group Cl, Br, I, OH, and $OCOCH_3$, and Y is a radical taken from the group OH, O-alkyl, O-alkyl-HgX.

2. A seed disinfectant comprising an organic mercury compound formed by the addition of a mercuric salt to an organic compound containing an ethylene linkage.

3. The seed disinfectant of claim 2 in which the organic compound is a hydrocarbon.

4. The seed disinfectant of claim 2 in which the organic compound is an aliphatic hydrocarbon.

5. A seed disinfectant comprising an organic mercury compound formed by the addition of a mercuric salt to an organic compound of the type $R=R'$, in which R and R' are hydrocarbon radicals.

6. The seed disinfectant of claim 5 in which the radicals R and R' are aliphatic hydrocarbons.

7. The seed disinfectant of claim 5 in which the hydrocarbon radical contains substituents taken from the group comprising a hydroxyl, and an oxy-alkyl.

8. The seed disinfectant of claim 5 in which the organic compound is taken from a group comprising ethylene, propylene, iso-butylene, and styrene.

9. The compound of claim 5 in which the mercuric salt is taken from a group comprising mercuric acetate, mercuric chloride, and mercuric sulphate, and the organic compound is taken from a group comprising ethylene, propylene, iso-butylene, and styrene.

10. The process of making seed disinfectants which comprises effecting a reaction with a mercuric salt by intimate contact in the dry state between an organic compound of the type $Y-R'-R_2-HgX$, in which $R_1$ and $R_2$ are hydrocarbon radicals, X is a radical taken from a group comprising Cl, Br, I, OH, and alkyl-OH, and Y is a radical taken from a group comprising OH, O-alkyl, O-alkyl-HgX, and obtaining the product directly in dry form.

11. The process of making seed disinfectants which comprises effecting a reaction by intimate contact in the dry state between a mercuric salt and an organic compound containing an ethylene linkage, and obtaining the product directly in dry form.

12. The process of claim 11 in which the mercuric salt is taken from a group comprising mercuric acetate, mercuric chloride, and mercuric sulphate.

13. The process of making seed disinfectants which comprises effecting a reaction by intimate contact in the dry state between a mercuric salt and an organic compound of the type $R=R'$, in which R and R' are hydrocarbon radicals, and obtaining the product directly in dry form.

14. The process of claim 13 in which the radicals R and R' are aliphatic hydrocarbons.

15. The process of claim 13 in which the hydrocarbon radical contains substituents taken from the group comprising a hydroxyl, and an oxy-alkyl.

16. The process of claim 13 in which the organic compound is taken from a group comprising ethylene, propylene, iso-butylene, and styrene.

17. The process of claim 13 in which the mercuric salt is taken from a group comprising mercuric acetate, mercuric chloride, and mercuric sulphate, and the organic compound is taken from a group comprising ethylene, propylene, iso-butylene, and styrene.

18. The invention of claim 1 in which Y is an organic compound taken from a group consisting of an ethanol mercury derivative and its homologues.

19. The invention of claim 2 in which the organic compound is taken from a group consisting of an ethanol mercury derivative and its homologues.

20. The invention of claim 2 in which the organic compound is oxy-ethyl mercury chloride.

In testimony whereof, I affix my signature.

MORRIS S. KHARASCH.